United States Patent [19]

Miyashita et al.

[11] Patent Number: 5,068,802
[45] Date of Patent: Nov. 26, 1991

[54] GRAPHIC DRAWING METHOD AND SYSTEM WITH INPUT COORDINATES AUTOMATICALLY ADJUSTABLE

[75] Inventors: Koujirou Miyashita, Kawasaki; Tetsuo Machida, Tokyo, both of Japan

[73] Assignees: Hitachi, Ltd.; Hitachi Microcomputer Engineering, Ltd., both of Tokyo, Japan

[21] Appl. No.: 518,249

[22] Filed: Aug. 3, 1990

Related U.S. Application Data

[63] Continuation of Ser. No. 488,413, Mar. 1, 1990, abandoned, which is a continuation of Ser. No. 226,369, Jul. 29, 1988, abandoned.

[30] Foreign Application Priority Data

Jul. 30, 1987 [JP] Japan ............................. 62-191192

[51] Int. Cl.⁵ .................. G06F 15/62; G06F 15/60; G06F 3/037
[52] U.S. Cl. ................................. 395/133; 340/747; 340/706; 395/143
[58] Field of Search ............. 340/747, 709, 706, 723; 364/917.96, 474.22, 474.24, 521, 518

[56] References Cited

U.S. PATENT DOCUMENTS

| | | | |
|---|---|---|---|
| 4,578,766 | 3/1986 | Caddy | 364/521 |
| 4,663,616 | 5/1987 | Himelstein | 340/724 |
| 4,683,468 | 7/1987 | Himelstein et al. | 340/709 |
| 4,703,321 | 10/1987 | Barker et al. | 340/724 |
| 4,757,549 | 7/1988 | Machart et al. | 340/706 |
| 4,849,911 | 7/1989 | Campian | 364/521 |

OTHER PUBLICATIONS

*Easy Cad*, Version 1.08, User's Manual, Jun. 1987, pp. 56-62.

*Primary Examiner*—Gary V. Harkcom
*Assistant Examiner*—Raymond J. Bayerl
*Attorney, Agent, or Firm*—Fay, Sharpe, Beall, Fagan, Minnich & McKee

[57] ABSTRACT

A graphic drawing method and system are provided to display a composite graphic composed of a plurality of fundamental graphics wherein an operator designates at least two points on a display screen using a pointing device to automatically display a straight line or a curve coupling the two points. As the coordinates input mode, there are provided an ordinary input mode and an auto-adjust mode. If a coordinate input command is given in the auto-adjust mode, it is determined whether the coordinates already inputted are present within a small area spaced apart by a predetermined distance from the cursor position. If present in the small, predetermined area, the coordinates already inputted are used as the present input coordinates. If not present in the small, predetermined area, the position coordinates of the cursor are used as the input coordinates.

8 Claims, 5 Drawing Sheets

| | | | |
|---|---|---|---|
| MAXIMUM DATA NUMBER : N | | | 14A |
| ALREADY STORED DATA NUMBER : m | | | 14B |
| TABLE ADDRESS : j | | | 14C |
| $P_1$ | $x_1$ | $y_1$ | |
| $P_2$ | $x_2$ | $y_2$ | 14D |
| ⋮ | ⋮ | ⋮ | |
| $P_N$ | | | |

_(5,068,802)_

GRAPHIC DRAWING METHOD AND SYSTEM WITH INPUT COORDINATES AUTOMATICALLY ADJUSTABLE

This is a file wrapper continuation application of U.S. Ser. No. 488,413, filed Mar. 1, 1990, which was a file wrapper continuation application of U.S. Ser. No. 226,369, filed July 29, 1988, now abandoned.

BACKGROUND OF THE INVENTION

The present invention relates to a graphic drawing method and system using coordinate input means, and more particularly to a graphic drawing method and system suitable for forming a composite graphic composed of a combination of fundamental graphics.

With high performance work stations widely used as office automation machines, it has become possible for an operator to interactively display a graphic on a display screen by using a pointing device such as a mouse.

In graphic data processing, not only can a fundamental graphic such as a straight line, a rectangular, a circle and the like be drawn, but also an optional graphic composed of a combination of fundamental graphics can be is drawn. For instance, in drawing a corner rounded rectangular composed of straight lines and circular arcs, it is difficult to make the end point of a straight line to correctly superpose upon the end point of a circular arc.

Some of composite graphics drawn in this manner are occasionally subjected to magnification/reduction or the like. In such a case, even if the end points of a composite graphic appear correctly superposed on the display screen, after the magnification/reduction, the shape of the composite graphic may deform. Deformity includes end points that are separated or line segments that are intersected.

To solve the above problems, a method has been proposed whereby a grid is displayed on the display screen. By using a so-called grid lock function, an input coordinate point is forced to superpose upon an intersected point of the grid. This method, however, poses a fatal problem. Such a function cannot be used without displaying the grid so the method is not versatile.

SUMMARY OF THE INVENTION

It is therefore an object of the present invention to provide a graphic drawing method and system capable of correctly superposing the end point of a presently forming line upon the end point of an already formed line.

It is another object of the present invention to provide a graphic drawing method and system capable of readily inputting the same coordinates as already inputted coordinates, by using a cursor.

To achieve the above objects of the present invention, a graphic drawing method for displaying a composite graphic composed of a plurality of fundamental graphics on a display screen comprises a first step of designating the type of a fundamental graphic to be displayed; a second step of reading inputted coordinates designated by a pointing device; a third step of comparing the inputted coordinates with the end point coordinates of each fundamental graphic already displayed on the display screen; and a fourth step of, if end point coordinates are found at said third step near the inputted coordinates within a predetermined distance from the inputted coordinates, determining the found end point coordinates as one of the end points of the fundamental graphic to be displayed, and if not, determining said inputted coordinates as one of the end points of the fundamental graphic to be displayed.

The above second to fourth steps are repeated every input operation of each end point of a fundamental graphic to be displayed. After all necessary end point coordinates are determined, lines and/or curves coupling the end points are automatically generated.

In practicing the present invention, the coordinates input mode for a pointing device may preferably be arranged to be switchable between an ordinary input mode and an auto-adjust input mode. In the ordinary input mode, a point (cursor position) designated by a pointing device is used as the end point of a fundamental graphic to be displayed. In the auto-adjust input mode, the above third and fourth steps are repeated. To make it easy for an operator to handle a pointing device, a frame mark indicating a predetermined range which moves with the cursor may preferably be displayed about the cursor which is indicating an input point. Use of the frame mark as a shooting range for a target point allows an operator to easily determine if a coordinates input command should be issued, by confirming that the frame mark moved to the position where it encircles the end point of a fundamental graphic already formed. The fourth step judges if there is an end point within the frame mark.

The foregoing and other objects, advantages, manner of operation and novel features of the present invention will be understood from the following detailed description when read in connection with the accompanying drawings.

DESCRIPTION OF THE PREFERRED EMBODIMENT

Figure 1:
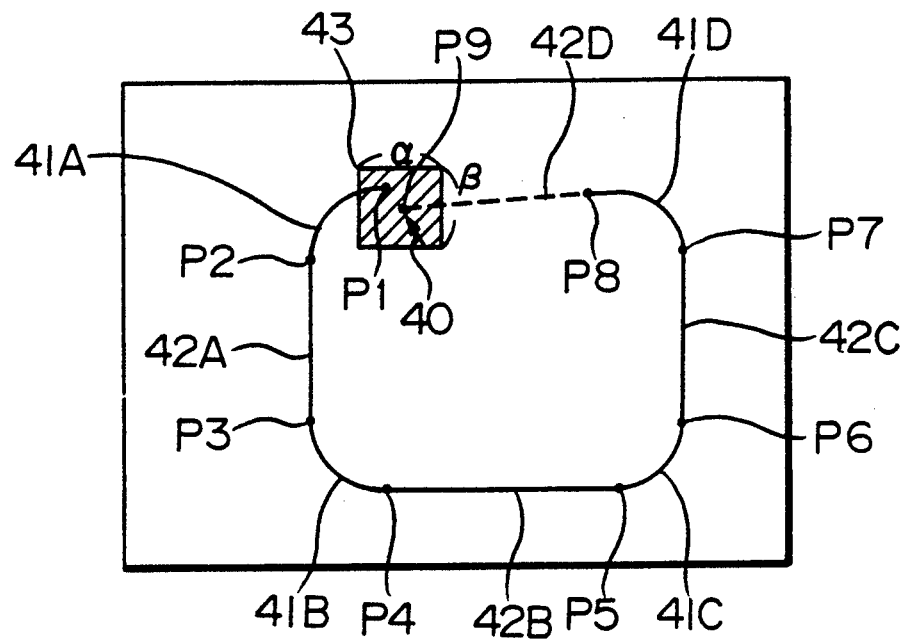
FIG. 1 illustrates an example of a cursor position during graphic data processing.

FIG. 1 shows an example of a displayed graphic obtained in the course of forming a corner rounded rectangular composed of fundamental graphics of circular arcs 41A to 41D and straight lines 42A to 42C. Each circular arc can be displayed by designating the opposite end coordinates, e.g., P1 and P2, and the center coordinates of the circular arc, by using a cursor 40. Each straight line can be displayed by designating both opposite end coordinates by the cursor 40. If the start point P1, finish point P2 and center of the circular arc P0 (not shown) are requested in this order as the input coordinates by the routine of displaying the circular arc 41A, the cursor is located at the point P0 after displaying the circular arc 41A. In this case, to display the next straight line 42A, the cursor must be correctly located at the start point P2 of the straight line 42A, i.e., at the finish point of the circular arc 41A. To display the last straight line 42D, the cursor 40 must be correctly located such that the finish point P9 of the straight line 42D is superposed upon the start point P1 of the circular arc 41A. The cursor 40 is moved by using a pointing device such as a mouse. Even if the operator handles it carefully, it is difficult to precisely locate the cursor at a predetermined position. Therefore, displacement of the point P9 from the point P1 often occurs as shown in FIG. 1 (displacement between two points is exaggerated in this case).

According to the present invention, a small area 43 having a predetermined size, e.g., length α and height β. around the current position of the cursor on the display screen is defined as a cursor coordinates automatically adjustable range. The cursor coordinates are arranged to be capable of being inputted either at a normal input mode or at an auto-adjust input mode.

Figure 2:
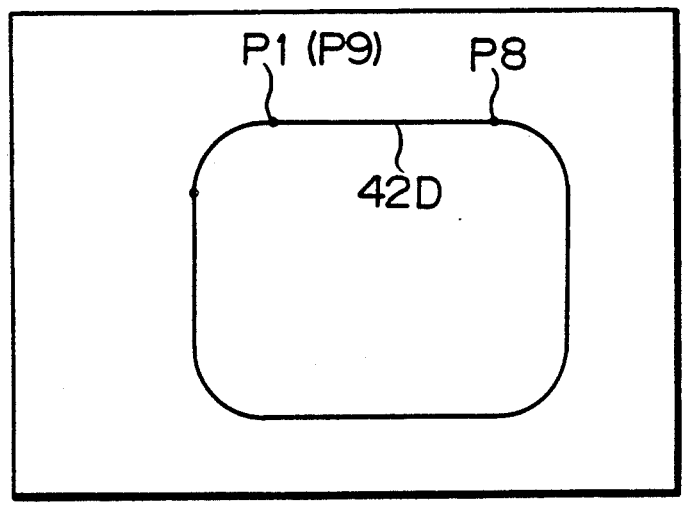
FIG. 2 shows an example of a graphic display obtained in accordance with the present invention.

In the ordinary input mode, the coordinates of the current position P9 of the cursor 40 are used as the input coordinates. In the auto-adjust input mode, the coordinates of the already inputted point P1 within the range 43 are used as the input coordinates by operating upon the cursor 40. In particular, in the auto-adjust input mode, the operator moves the cursor 40 toward the target point P1, and when the cursor position P9 and the target point P1 both enter within the automatically adjustable range 43, the operator gives a coordinates read command. In the auto-adjust input mode, even if the cursor coordinates read command is given under the condition that the current cursor position P9 and the target position P1 are spaced apart, the coordinates coincident with the target point P1 are inputted so that the straight line coupling the points P8 and P1 can be obtained without any displacement as shown in FIG. 2.

Figure 3:
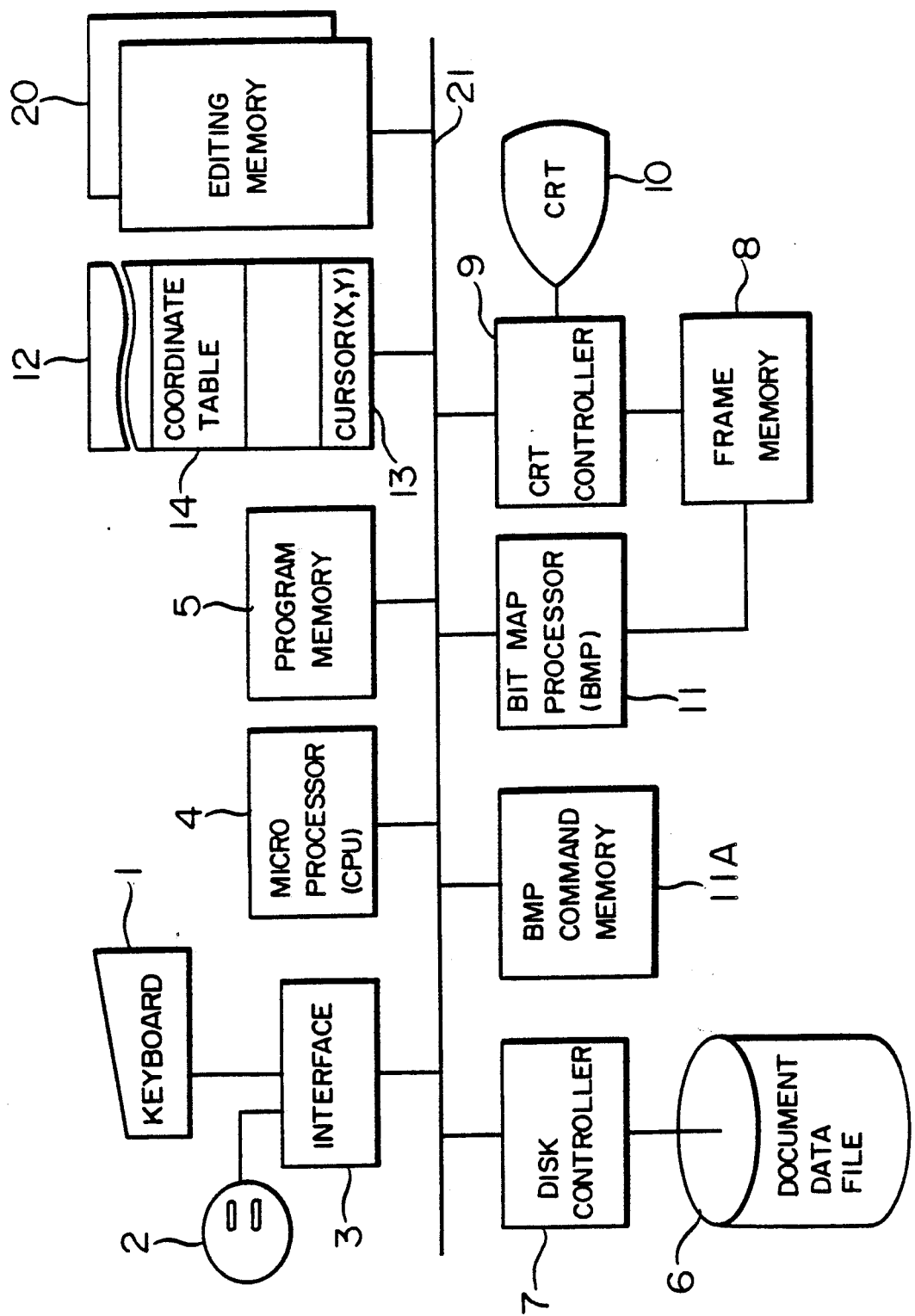
FIG. 3 is a block diagram showing an example of the overall arrangement of the graphic drawing system according to the present invention.

FIG. 3 is a block diagram showing an embodiment of the graphic drawing system of this invention having the ordinary input mode and the auto-adjust input mode described previously. In the Figure, the graphic drawing system comprises a keyboard 1 having data input keys and command input keys, a mouse (pointing device) 2 for moving the cursor on the screen and issuing a coordinates input command, an interface 3 of the input devices 1 and 2 relative to a bus 21, a microprocessor 4, a memory 5 for storing various programs to be executed by the microprocessor 4, a file device (disk) 6 for storing document data, a disk controller 7 for controlling the file device, a frame memory 8, and a CRT controller 9 for supplying the contents of the frame memory to a CRT display 10. The graphic drawing system further comprises a bit map processor (BMP) 11 responsive to a command from the microprocessor 4 for developing code data or graphic data of dot patterns into the frame memory 8, a BMP command memory 11A for storing commands necessary for the operation of BMP 11, a work memory 12, and an editing memory 20 for storing document editing data such as code data or graphic vector data. A store area 13 in the work memory 12 stores therein the coordinates (Xi, Yi) of a current position Pi of the cursor on the screen, the contents of the store area 13 changing with the movement of the mouse.

Figures 4, 5:
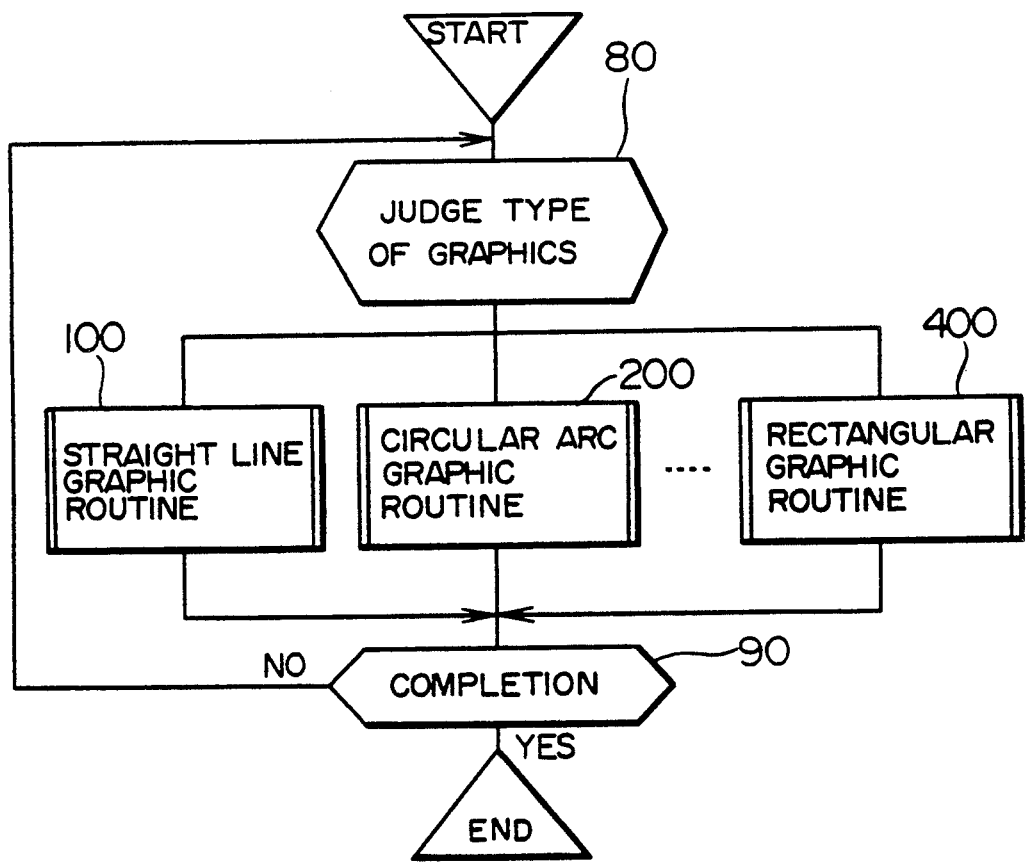
FIG. 4 is a memory map of a cursor coordinates store table.
FIG. 5 is a flow chart illustrating a graphic data processing program.

The graphic drawing system of this invention has a table 14 in the work memory 12 to store cursor coordinates. The table 14 is constructed of, as shown in FIG. 4, a data area 14D, a maximum data (coordinate point) number N area which indicates the data amount capable of being stored in the data area 14D, a data number m area which indicates the number of data already stored in the data area 14D, and an address j area for the data to be stored next in the data area 14D. Cursor coordinates inputted by the operator for the purpose of graphic data processing are sequentially stored in the data area 14D. In the auto-adjust input mode, this table is referred to for the search of target point coordinates.

FIG. 5 illustrates the outline of a graphic data processing program. Upon start of the graphic data processing, a graphic type designation command inputted by the operator is checked at step 80 to execute an associated straight line graphic routine 100, a circular arc graphic routine 200 or a rectangular graphic routine 400. After completion of one of the graphic routines, it is checked at step 90 in order to determine if there is a graphic drawing completion command. If another graphic type designation command was inputted, the flow returns to step 80 and repeats the above graphic data processing.

Figure 6:
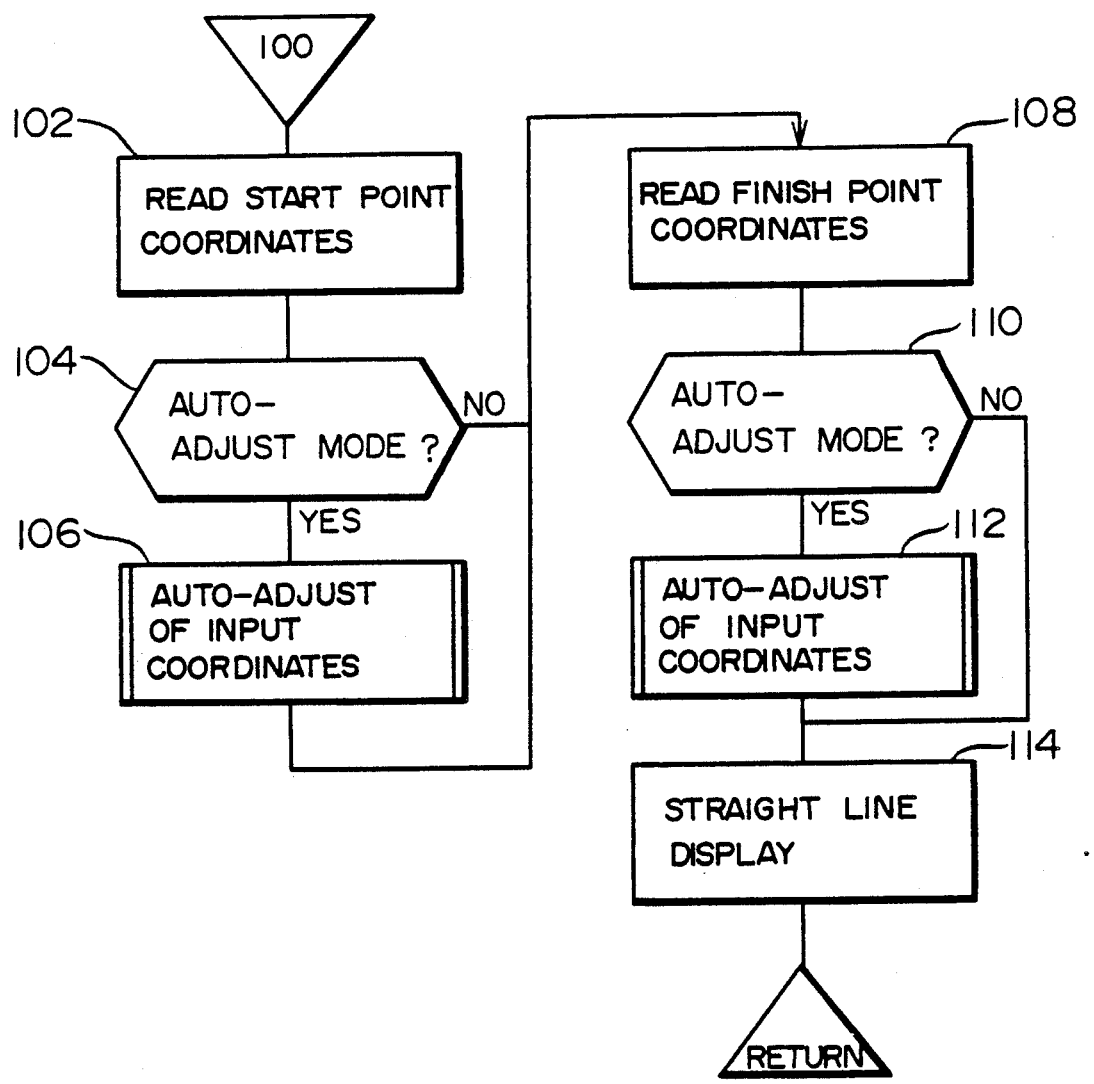
FIG. 6 is a flow chart illustrating a routine program for drawing a straight line.

The detail of the straight line graphic routine is shown in FIG. 6. In the straight line graphic routine, at step 102 the coordinates (Xi, Yi) of the cursor position when the operator issues an input command are read as the coordinates (X, Y) of the start point Ps of a straight line and stored in the editing memory 20. Next, at step 104, the input mode for the cursor is judged. In case of the ordinary input mode, the flow advances to step 108 whereat the coordinates of the finish point Pe of the straight line are read. Alternatively, in case of the auto-adjust input mode, after executing an input coordinates auto-adjust routine 106, the flow advances to step 108. At the auto-adjust routine 106, the coordinates (Xx, Yy) of the already inputted target point Pt near the cursor position Pi are searched with reference to the table 14 as described later and are adopted as the coordinates of the start point Ps. The coordinates at the finish point Pe are read in the similar manner as the start point Ps (steps 108 to 112). After the end of reading both the start and finish points Ps and Pe, a command of displaying a straight line coupling the two points is given to BMP 11 at step 114 to thereafter display the straight line on the screen Other line segment graphic routines such as the circular arc graphic routine 200 and the rectangular graphic routine 400 have the cursor input mode judgment step and the input coordinates auto-adjust step as above.

Figure 7:
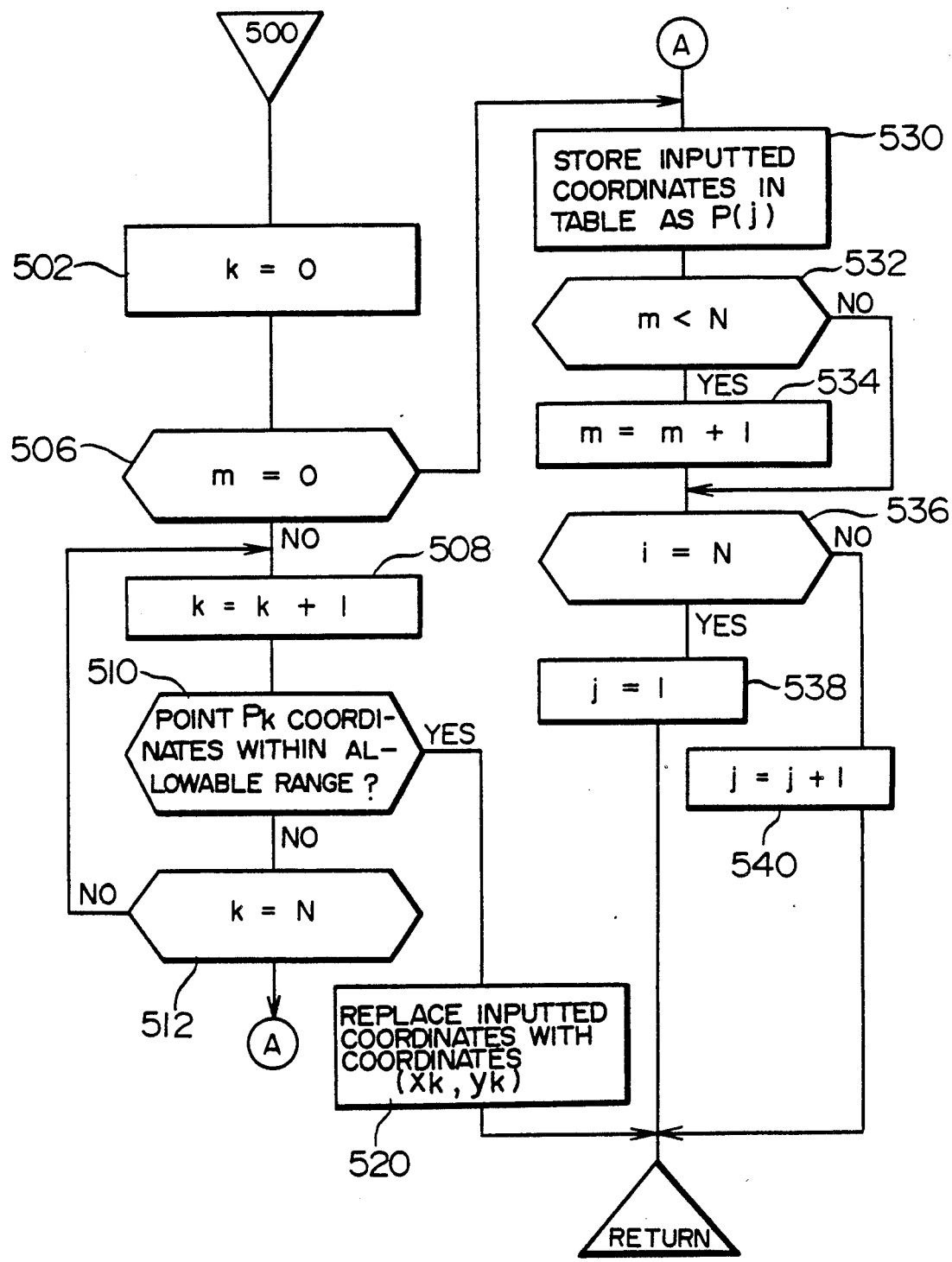
FIG. 7 is a flow chart illustrating a routine program for automatically adjusting inputted coordinates.

FIG. 7 shows an example of the inputted coordinates auto-adjust routine 500 executed at steps 106 and 112 shown in FIG. 6. In the auto-adjust routine, an initial value of a parameter K is set at 0 at step 502. Next, it is determined at step 506 whether the already stored data number m in the coordinates table 14 is 0 or not. If not, the parameter k is incremented by 1 at step 508 to search the data area 14D and determine if the k-th point data Pk in the coordinates table is included within the automatically adjustable range (auto-adjust range) at step 510. If not included, the table search is repeated while incrementing the k value (steps 508 to 512). If coordinates (Xk, Yk) included within the auto-adjust range are found, the flow advances to step 520 whereat the coordinates (Xk, Yk) are determined as the coordinates of the start point Ps (or finish point Pe). If the coordinates corresponding to the auto-adjust target point are not found within the table 14, the flow advances to step 530 whereat the cursor coordinates (Xi, Yi) are stored in the table 14D as the j-th point P(j) coordinates. Next, the store data number m is compared with the allowable maximum data number N, and if m<N, then the value m is incremented by 1 (steps 532 to 534). Then the table address j is compared with N, and if j=N, the value i is set at 1. If not, j is incremented by 1 (steps 536 to 540).

The judgment at step 510 whether the point Pk is included within the auto-adjust area or not is performed by comparing the inputted coordinates (Xi, Yi) and the coordinates (Xk, Yk) of the point Pk as in the following:

$$|Xi - Xk| < \alpha/2$$

$$|Yi - Yk| < \beta/2$$

where $\alpha$ and $\beta$ represent the length and height of the area 43 for the auto-adjust range, respectively, which may take a value of, e.g., from 2 mm to 6 mm.

The switching of the cursor input mode of this invention may be effected by way of example through the depression of a function key provided on the keyboard 1 or the selection of a function key displayed on the CRT screen. If the frame mark 43 indicating the auto-adjust range as shown in FIG. 1 is arranged to move during the input coordinates auto-adjust mode operation in the same way as the cursor 40 moves, such an arrangement helps the operator to draw a graphic. In this case, the frame mark 43 is not limited to a rectangular, but various shapes such as a circle may be applied. The cursor handling by the operator becomes easy if a large frame area 43 is used. However, in this case, a plurality of already stored coordinates may be present within the auto-adjust range so that the steps 508 to 512 shown in FIG. 7 are modified to select the coordinate point nearest to the inputted cursor coordinates (Xi, Yi).

We claim:

1. A graphic drawing method of drawing a composite graphic composed of a plurality of fundamental graphics on a display screen, at least two end points of each fundamental graphic being designated by a pointing device, comprising:
   a first step of designating the type of fundamental graphic to be drawn;
   a second step of reading input coordinates inputted by said pointing device to designated one end point of the fundamental graphic to be drawn;
   a third step of comparing said inputted coordinates with the end point coordinates of each fundamental graphic already drawn on said display screen and stored in a table means for storing end point coordinates;
   a fourth step of, if end point coordinates are found in said table means near said input coordinates, determining said found end point coordinates as one of the end points of said fundamental graphic to be drawn, and if not, determining said input coordinates as one of the end points of said fundamental graphic to be drawn;
   a fifth step of repeating said second to fourth steps for each end point of said fundamental graphic to be drawn until all end points necessary for said fundamental graphic have been prepared;
   a sixth step of calculating the drawing line data of said fundamental graphic based on the coordinates of each end point; and,
   a seventh step of drawing a new fundamental graphic defined by said calculated line data on said display screen, thereby to display adjacent fundamental graphics by sharing their end points.

2. The graphic drawing method according to claim 1 wherein
   if said input coordinates are determined at said fourth step to be used as the end point of said fundamental graphic to be displayed, said input coordinates are stored in said table means.

3. A graphic drawing method of drawing a composite graphic composed of a plurality of fundamental graphics on a display screen, at least two end points of each fundamental graphic being designated by a pointing device, comprising:
   a first step of designating the type of a fundamental graphic to be drawn;
   a second step of reading input coordinates inputted by said pointing device to designate one end point of the fundamental graphic to be drawn;
   a third step of comparing said inputted coordinates with the end point coordinates of each fundamental graphic already drawn on said display screen and stored in a table means for storing end point coordinates;
   a fourth step of, if end point coordinates are found in said table means near said input coordinates within a predetermined distance from said input coordinates, determining said found end point coordinates as one of the end points of said fundamental graphic to be drawn, and if not, determining said input coordinates as one of the end points of said fundamental graphic to be drawn;
   a fifth step of repeating said second to fourth steps for each end point of said fundamental graphic to be drawn until all end points necessary for said fundamental graphic have been prepared;
   a sixth step of calculating the drawing line data of said fundamental graphic based on the coordinates of each end point;
   a seventh step of drawing a new fundamental graphic defined by said calculated line data on said display screen, thereby to display adjacent fundamental graphics by sharing their end points; and,
   a step of selecting an end point input mode, wherein if a first input mode is selected, said third and fourth steps are neglected and said coordinates inputted by said pointing device are determined to be used as the end point of said fundamental graphic to be drawn and if a second input mode is selected, said third and fourth steps are performed.

4. A graphic drawing method of drawing a composite graphic composed of a plurality of fundamental graphics on a display screen, each fundamental graphic being drawn by automatically generating a straight line or a curve based on input coordinates of at least two end points respectively designated by a pointing device, comprising:
   a first step of displaying on said display screen a cursor which includes a frame mark indicating a partial area of said display screen and an indicator for indicating a point within said frame mark;
   a second step of causing said cursor to move on said display screen by operating said pointing device;
   a third step of reading and storing the position coordinates of said indicator as candidates for the input coordinates when a coordinates input command is supplied from said pointing device;
   a fourth step of judging if coordinates of an end point of one of other fundamental graphics already drawn on said display screen and stored in a table means for storing end point coordinates are included within said frame mark;

a fifth step of, if end point coordinates of said one other fundamental graphic are judged at said third step to be within said frame mark, determining the coordinates of said judged end point to be used as input coordinates of one of the end points of a new fundamental graphic instead of said read-out coordinates, and if not, determining the read-out coordinates as said input coordinates;

a sixth step of storing said read-out coordinates in said table means if they had been determined to be used as the input coordinates of one of the end points of said fundamental graphic;

a seventh step of repeating said second to sixth steps for each end point until all coordinates necessary for drawing said new fundamental graphic have been prepared; and, an eighth step of drawing said new fundamental graphic on said display screen according to line data calculated based on said input coordinates of said end points.

5. A graphic drawing system for displaying a composite graphic comprised of a plurality of fundamental graphics comprising:

a display screen;

a pointing device for designating a plurality of end points necessary for calculation of drawing line data of each fundamental graphic to be displayed on the display screen;

first means for designating the type of a fundamental graphic to be drawn;

second means for reading input coordinates designated by said pointing device;

third means for comparing said input coordinates with the end point coordinates of each fundamental graphic already displayed on said display screen by referring to a table means for storing said end point coordinates;

fourth means for, if end point coordinates are found near said input coordinates, determining said found end point coordinates as one of the end points of said fundamental graphic to be drawn, and if not, determining said input coordinates as one of the end points of said fundamental graphic to be drawn; and, fifth means for calculating drawing line data of said fundamental graphic based on the coordinates of each end point after a predetermined number of end points have been designated by said pointing device and for drawing said fundamental graphic on said display screen according to said line data.

6. The graphic drawing system according to claim 5, further comprising means for selectively storing the input coordinates in said table means in addition to coordinates of already formed fundamental graphics only when said input coordinates are determined as the end point by said fourth means.

7. A graphic drawing system for displaying a composite graphic comprised of a plurality of fundamental graphics comprising:

a display screen;

a pointing device for designating a plurality of end points necessary for calculation of drawing line data of each fundamental graphic to be displayed on the display screen;

first means for designating the type of a fundamental graphic to be drawn;

second means for reading input coordinates designated by said pointing device;

third means for comparing said input coordinates with the end point coordinates of each fundamental graphic already displayed on said display screen by referring to a table means for storing said end point coordinates;

fourth means for, if end point coordinates are found near said input coordinates, determining said found end point coordinates as one of the end points of said fundamental graphic to be drawn, and if not, determining said input coordinates as one of the end points of said fundamental graphic to be drawn;

fifth means for calculating drawing line data of said fundamental graphic based on the coordinates of each end point after a predetermined number of end points have been designated by said pointing device and for drawing said fundamental graphic on said display screen according to said line data; and, sixth means for selecting an end point input mode, wherein if an input mode is selected, said coordinates inputted by said pointing device are determined to be used as the end point of said fundamental graphic to be drawn, and if a second input mode is selected, said third and fourth means are activated.

8. A graphic drawing system for displaying a composite graphic comprised of a plurality of fundamental graphics comprising:

a display screen;

a pointing device;

first means for designating the type of a fundamental graphic to be drawn on said display screen;

second means for displaying each fundamental graphic designated by said first means on said display screen by automatically generating drawing line data calculated based on coordinates of at least two points respectively designated by said pointing device;

third means for displaying on said display screen a cursor which includes a mark indicating a partial area of said display screen and an indicator for indicating a point within said frame mark;

fourth means for reading and storing the position coordinates of said indicator as a candidate for the input coordinates of an end point when a coordinates input command is supplied from said pointing device;

fifth means for judging by referring to a table means if coordinates of an end point of another fundamental graphic already displayed on said display screen is included within said frame mark;

sixth means operable in response to said firth means for, if end point coordinates of said another fundamental graphic are judged to be included within said frame mark, determining the coordinate of said included end point to be used as input coordinates instead of said read-out coordinates, and if not, determining said read-out coordinates as the input coordinates; and seventh means for selectively storing said input coordinates in said table means only when said read-out coordinates are determined to be used as the coordinates of one of the end points of said fundamental graphic to be newly displayed on said display screen, wherein said second means generates said drawing data when a necessary number of end points determined in accordance with the type of the fundamental graphic are inputted by said pointing device.

* * * * *